United States Patent
Bhakta

(10) Patent No.: US 9,658,447 B2
(45) Date of Patent: May 23, 2017

(54) MULTIPLE ILLUMINATION SOURCES FOR DMD LIGHTING APPARATUS AND METHODS

(71) Applicant: Texas Instruments Incorporated, Dallas, TX (US)

(72) Inventor: Vikrant R. Bhakta, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 205 days.

(21) Appl. No.: 14/506,049

(22) Filed: Oct. 3, 2014

(65) Prior Publication Data

US 2015/0160454 A1    Jun. 11, 2015

Related U.S. Application Data

(60) Provisional application No. 61/913,755, filed on Dec. 9, 2013.

(51) Int. Cl.
*G02B 26/08* (2006.01)
*F21S 8/10* (2006.01)

(52) U.S. Cl.
CPC ........ *G02B 26/0833* (2013.01); *F21S 48/115* (2013.01); *F21S 48/1145* (2013.01); *F21S 48/1747* (2013.01); *F21S 48/1757* (2013.01)

(58) Field of Classification Search
CPC ....... F21S 48/1145; F21S 48/115; F21S 48/13
See application file for complete search history.

(56) References Cited

U.S. PATENT DOCUMENTS

| | | | |
|---|---|---|---|
| 6,034,660 A | 3/2000 | Millward et al. | |
| 6,193,393 B1 | 2/2001 | Dove et al. | |
| 6,497,503 B1 | 12/2002 | Dassanayake et al. | |
| 2002/0196636 A1 | 12/2002 | Dassanayake | |
| 2005/0219847 A1 | 10/2005 | Ikeda et al. | |
| 2007/0040998 A1 | 2/2007 | Yamazaki et al. | |
| 2013/0058114 A1 | 3/2013 | Reiners | |
| 2016/0033757 A1* | 2/2016 | Kurtz | H04N 5/7458 359/292 |

OTHER PUBLICATIONS

International Search report, mailing date Apr. 16, 2015.

* cited by examiner

*Primary Examiner* — Elmito Breval
(74) *Attorney, Agent, or Firm* — Michael A. Davis, Jr.; Charles A. Brill; Frank D. Cimino

(57) ABSTRACT

A DMD illumination system having multiple illumination sources. A DMD illumination system is provided that includes a plurality of illumination sources, each of the illumination sources directing light onto the digital micro-mirror device corresponding to a respective position of an array of micro-mirrors, each illumination source being positioned to cause reflected light from the array of micromirrors to be projected out of the system, and control circuitry coupled to the plurality of illumination sources and to the digital micro-mirror device configured for controlling the position of the array of micro-mirrors and further configured for providing control signals for turning each of the plurality of illumination sources on and off, so that the light from the plurality of illumination sources strikes the array of micro-mirrors and the light is reflected from the digital micro-mirror device and out of the system. Methods are also disclosed.

20 Claims, 8 Drawing Sheets

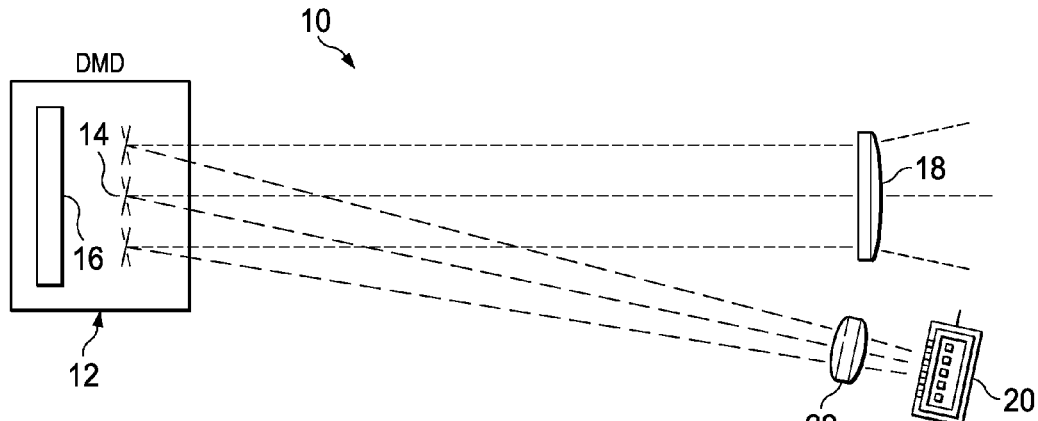
FIG. 1
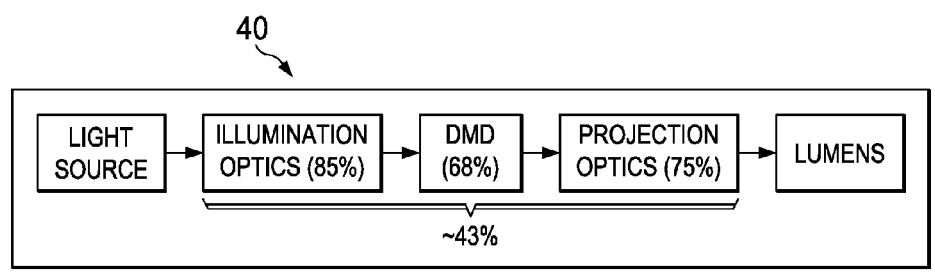
FIG. 3
| DMD | F/# | AOI | LED | LUMEN |
|---|---|---|---|---|
| 0.3 WVGA | 1.2 | 36° | Q6WP | 345lm |
| *0.3 WVGA | 1.2 | 36° | LE UW U1A3 | 385lm |
| *0.47 1080P | 1.7 | 34° | LE UW U1A3 | 430lm |
| *0.47 1080P | 1.7 | 34° | LE UW U1A5 | 560lm |
| *0.47 1080P | 1.5 | 36° | LE UW U1A5 | 690lm |
FIG. 4

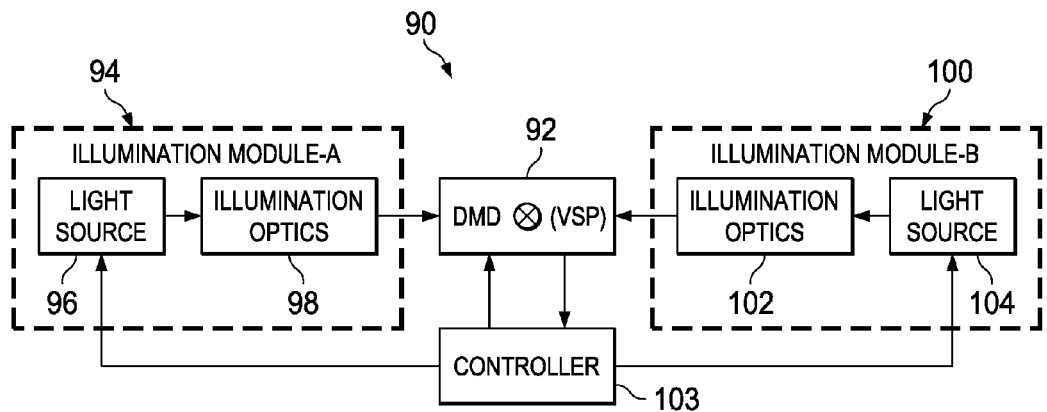
FIG. 8A
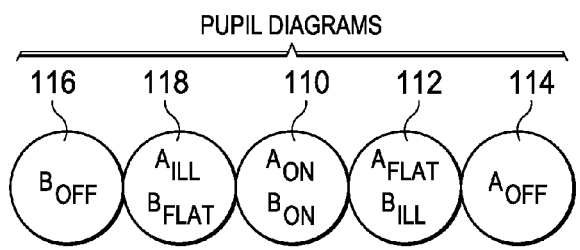
FIG. 8B
| DMD | F/# | AOI | LED | SINGLE ILLUMINATION LOW TEMPERATURE 100% DC | SINGLE ILLUMINATION HIGHER TEMPERATURE DC - 50/50 | DUAL ILLUMINATION HIGHER TEMPERATURE DC - 50/50 |
|---|---|---|---|---|---|---|
| 0.3 WVGA | 1.2 | 36° | Q6WP | 345lm | 260lm | 520lm |
| *0.3 WVGA | 1.2 | 36° | LE UW U1A3 | 385lm | 290lm | 580lm |
| *0.47 1080P | 1.7 | 34° | LE UW U1A3 | 430lm | 320lm | 645lm |
| *0.47 1080P | 1.7 | 34° | LE UW U1A5 | 560lm | 420lm | 840lm |
| *0.47 1080P | 1.5 | 36° | LE UW U1A5 | 690lm | 480lm | 1035lm |
FIG. 12

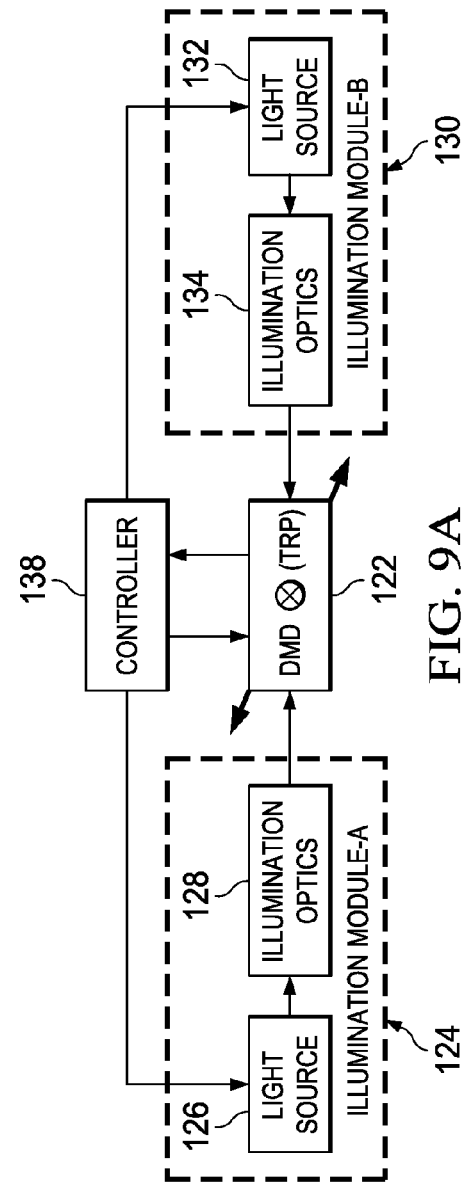
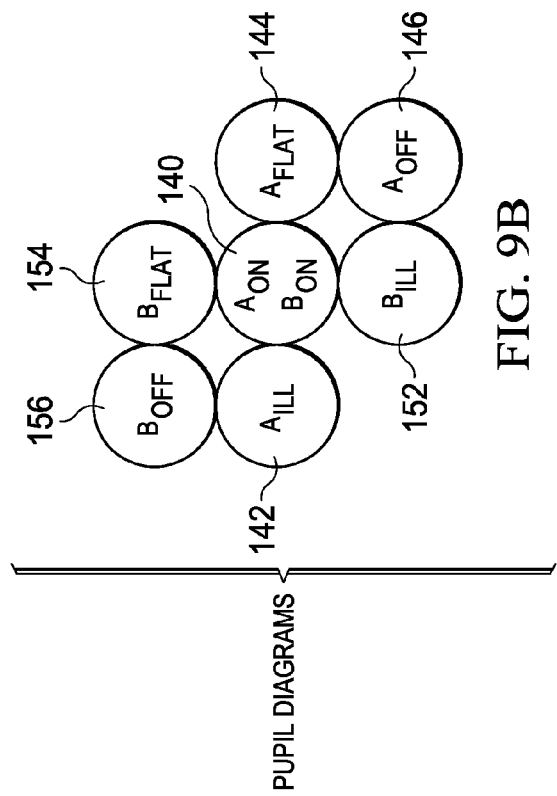

MULTIPLE ILLUMINATION SOURCES FOR DMD LIGHTING APPARATUS AND METHODS

RELATED APPLICATIONS

This patent application claims priority to U.S. Provisional Patent Application Ser. No. 61/913,755, entitled "DUAL ILLUMINATION DMD HEADLAMP", filed on Dec. 9, 2013, which is hereby incorporated by reference herein in its entirety.

TECHNICAL FIELD

The embodiments relate generally to the use of MEMS reflective devices such as digital micro-mirrors (DMD) devices when used to project light. Applications of DMD projection include automotive headlamps, projection displays, spotlights, flashlights, aircraft lamps, marine lamps and other illumination and light beam applications such as event lighting, stage lighting and the like. In a non-limiting example application an automotive headlamp is provided including a DMD device that is illuminated and projects a beam of light through a lens or other optics. The embodiments advantageously provide a light or lamp using a DMD device as a projection source with greater brightness and reliability than was previously possible.

BACKGROUND

Lighting with DMD projection offers the opportunity to provide bright and even adaptive lighting solutions for many applications. Because the DMD array is "pixel addressable", the projected beam of light formed with a DMD device can be adaptively shaped and masked using DMD devices to suit a variety of needs.

However, obtaining the brightness required for these applications with a DMD device that is reliable and robust has not been possible using the prior known approaches. DMD lighting efficiency is limited by the efficiency of the illumination sources and by etendue limitations of the DMD device. Further, in order to obtain the brightness needed in an automotive headlamp application for example, a DMD array in the prior known arrangements would need to be "on" 100% of the time. However, when a DMD array is operated in this manner in an environment where high operating temperatures will exist, hinge memory problems and stiction problems inevitably arise in the micro-mirror devices. A prior solution to the hinge memory problems is to operate the DMD in a lowered duty cycle, for example at a 50% duty cycle. Operating the DMD at a 50% duty cycle moves the hinge in the micro mirrors from an "on" position to an "off" position in a repeating cycle, using a clock and control signals, moving the micro-mirrors every other clock cycle avoids the hinge memory or stuck mirror problems. However, the brightness obtained at the output of the lamp system is substantially reduced when the DMD is operated in this manner, as the light is only reflected out to the projection optics 50% of the time.

FIG. 1 illustrates a conventional arrangement using a DMD device to project light for illumination. The system 10 of FIG. 1 is presented to further illustrate the problems of prior known approaches. In system 10, a single light source 20 and illumination optics 22 are used to direct light from the light source 20 onto the face of a DMD device 12. The DMD device 12 is formed by micro-electromechanical system (MEMS) technology which is based in part on semiconductor device processing. A semiconductor substrate 16 is processed using semiconductor processing steps such as photolithography and other steps including deposition, patterning, etching and metallization steps. An array of micro-mirrors 14 is formed over the substrate 16. In an example process the micro-mirrors are formed of aluminum and are mounted on a hinged mechanism. The micro-mirrors are attached on a hinge and can be tilted using electronic signals applied to electrodes that control a tilt by pivoting the micro-mirrors about an axis. In an example DMD device, thousands and even millions of the micro-mirrors are formed in an array that forms a VGA, 720p or 1080p resolution imaging device, for example. When used in a lamp application, individual micro-mirrors 14 are positioned to reflect the light from the illumination optics 22 to a projection lens 18 and a beam of light is projected out of the system 10.

The micro-mirrors 14 have three individual states, a first "on" state; second a flat or parked state, and finally an "off" state. In the "on" state, the micro-mirrors 14 in FIG. 1 are tilted in a first tilted position from the flat position, due to signals on an electrode that cause the hinge to flex, and in system 10 the micro-mirrors 14 are positioned to reflect incoming light from illumination optics 22 outwards to the projection lens 18. In the "off" state, the micro-mirrors 14 are tilted in a different tilted position to reflect the light away from the projection lens 18. By varying the tilted positions using electrical control signals, the micro-mirrors 14 can be used to direct light to the projection lens 18 or the reflected light can be reflected away from the projection lens 18. The flat state is a safe position the mirrors take when no power is applied to the device. In the flat state, the micro-mirrors 14 are not tilted as no power is applied to the control electrodes.

FIG. 2 further illustrates the operation of the micro-mirrors in a DMD array. In FIG. 2, in a projection system 30 a single illustrative micro-mirror 38 illustrates the various positions used for the micro-mirrors. In the "on" state, the micro-mirror 38 is at a first tilted position, for example at +12 degrees from the vertical or flat position. The illumination source 36 is angled at −24 degrees from the zero degree position, which is aligned with the projection lens 34. Because in reflection from a mirror, the angle of incidence (AOI) of the incoming light is equal to the angle of reflection (i) of the reflected light, for a +12 degree tilt, the −24 degree angle for the illumination source results in reflected light at the zero degree position as shown in FIG. 2. The cone of reflected light labeled "on state energy" shows the reflected light directed outwards from the micro-mirror 38 at the zero degree position. Other DMD devices may provide different tilt angles, such as +/−10 degrees, or +/−17 degrees. When the micro-mirror 38 is in the "on" state, the light from the illumination source 36 is reflected as the cone of light labeled "on state energy" at zero degrees into the projection lens 34. The projected light is then output from the system 30. The micro-mirrors can also be put in a "flat" state position, when the system is not powered, and the micro-mirrors can also be put in an "off" state. In the "off" state position, the micro-mirror 14 is at a second tilted position at an angle of −12 degrees from the flat position, and in the "off" state the light that strikes the micro-mirror is reflected away from the projection lens 34, and is not output from the system 30 but instead is output into a light dump 32. In conventional projection systems the flat position of the micro-mirror 38 is not used when power to the system is applied, but is instead used when the system is not powered. The flat position is sometimes referred to as a "parked" or "safe" position for the micro-mirror 38.

Each stage of the system 30 has some losses. The light source 36 outputs light at a certain brightness. The illumination optics in an example system has an efficiency of about 85%. The DMD device consists of thousands or millions of individual micro-mirrors such as 38. The mirrors are spaced from one another and the dark spaces between the micro-mirrors do not reflect light. The DMD device also has a transparent cover that also has some transmission losses. The DMD device has an overall efficiency of about 68%. The projection optics 34 in an example system has an efficiency of about 75%. The combined efficiency from the surface of the light source to the output of the projection lens in an example system is about 43%, the multiple of the individual efficiencies for the components coupled in the light path of the system. This is shown in table 40 in FIG. 3.

To determine the possible brightness that can be obtained with a system such as the conventional system 10 in FIG. 1, simulations were performed. Two different DMD device technologies, each available from Texas Instruments, Incorporated were evaluated. A first DMD device that has a mirror array which measures 0.3 inches diagonally and which provides a wide VGA (WVGA) resolution was evaluated. A second DMD device that has a mirror array that measures 0.47 inches diagonally with 1080p resolution was evaluated. Several light sources were evaluated. The light sources evaluated and shown in FIG. 4 are commercially available LED devices obtained from OSRAM Opto Semiconductors Company. Descriptions of the OSRAM LED devices are available at the world wide web uniform resource locator address http://www.osram-os.com/osram_os/en/products/product-catalog/led-light-emitting-diodes/osram-ostar/osram-ostar-headlamp/index.jsp. These LED devices are intended for use in headlamp applications. The Osram LEDs listed in table 45 of FIG. 4 have a range of brightness from about 800 lumens to over 1500 lumens. The brightness that could be obtained from a system such as system 10 in FIG. 1 was evaluated using these LEDs with a 100% DMD duty cycle. That is, the micro-mirrors in the DMD device were assumed to always be positioned in the "on" position to provide the maximum brightness available, which requires that the micro-mirrors be positioned in the "on" state 100% of the time. However, in this configuration, the brightness that can be obtained is not sufficient for applications such as automotive headlamps. As seen in table 45 presented in FIG. 4, the maximum brightness at the output obtained in these example configurations for systems such as the system 10 in FIG. 1 was 690 lumens.

Additional challenges in the prior known approaches occur with increasing DMD temperature. In an automotive application, for example, the headlamp is subjected to the heat caused by the operation of an automotive engine, as well as the ambient temperature, and the heat generated by an illumination source. When the DMD temperature exceeds a certain operating temperature that is specified by the manufacturer, and which temperature varies with the process used to fabricate the DMD device, if operated at a 100% duty cycle, DMD hinge memory and stiction problems are certain to occur. In an example DMD device this temperature is about 65 degrees Celsius, but as manufacturing processes continue to improve this temperature rating tends to increase. Because the lamp applications may require operating in environments where the ambient temperature is quite high, the thermal budget is difficult to manage using known prior solutions. Operating the DMD in these high temperature environments can therefore lead to hinge memory and stiction failures. In the prior known approaches, avoiding the hinge memory and stiction problems necessitates use of a 50/50 duty cycle for the DMD device when temperatures are expected over the critical operating temperature, which further limits the brightness that can be achieved.

Improvements in illumination using light projection incorporating DMD devices are therefore needed to address the deficiencies and the disadvantages of the known prior approaches. Solutions are needed that are robust, that provide reliable device operation with long device life, and that are easy to implement and use.

SUMMARY

Aspects of the present application provide solutions to the use of DMD illumination systems that overcome the deficiencies and the disadvantages of the prior known solutions. In an aspect of the present application, multiple illumination sources are used with a DMD device to project a beam from an illumination system. The DMD device includes an array of micro-mirrors that can be placed at a plurality of positions. The multiple illumination sources are placed proximately to the DMD device and are each positioned so that light from the respective illumination source is reflected by the micro-mirrors of the DMD device when the micro-mirrors are in a corresponding one of the plurality of positions. The reflected light is collected into light projection optics and then output from the system.

In one aspect of the present application, a DMD illumination system is provided that includes a plurality of illumination sources arranged proximate to a digital micro-mirror device, each of the illumination sources directing light onto the digital micro-mirror device at an angle of incidence corresponding to a respective position of an array of micro-mirrors within the digital micro-mirror device, each illumination source of the plurality of illumination sources being positioned to cause reflected light from the array of micro-mirrors to be directed out of the system; and control circuitry coupled to the plurality of illumination sources and to the digital micro-mirror device configured for controlling the position of the array of micro-mirrors by applying one or more control signals to the digital micro-mirror device, and further configured for providing control signals to the plurality of illumination sources, so that the light from the plurality of illumination sources strikes the array of micro-mirrors when they are at the respective positions, and the light is reflected from the digital micro-mirror device and out of the system.

In another aspect of the present application, a method is provided for projecting light for illumination from a DMD device, including: directing light from a plurality of illumination sources proximate to a digital micro-mirror device onto an array of micro-mirrors in the digital micro-mirror device having a plurality of positions, each of the plurality of positions corresponding to the position of one the plurality of illumination sources, the light from the plurality of illumination sources being reflected from the array of micro-mirrors towards a light projection system; collecting the reflected light into the light projection system configured for projecting the collected light; and controlling the position of the micro-mirrors in the array of micro-mirrors to put the micro-mirrors in a particular one of the plurality of positions, and controlling the plurality of light sources so that for the particular one of the positions, light from a respective one of the plurality of illumination sources is directed to the array of micro-mirrors and reflected into the light projection system.

In still another aspect of the present application, a dual illumination source DMD headlamp includes a digital micro-mirror device having an array of micro-mirrors that are configured to move between a first tilted position and a second tilted position, responsive to control signals; a first illumination source positioned to direct light onto the array of micro-mirrors when the array of micro-mirrors are in the first tilted position; a second illumination source positioned to direct light onto the array of micro-mirrors when the array of micro-mirrors are in the second tilted position, a light projection optics configured to collect light reflected from the array of micro-mirrors and having a lens to project the light out of the DMD headlamp; and a controller configured to send control signals to the digital micro-mirror device to place the array of micro-mirrors in the first tilted position and the second tilted position while simultaneously pulsing the first illumination source and the second illumination source, so that light output from the first illumination source and the second illumination source is reflected from the array of micro-mirrors into the light projection optics and out of the lens.

Previously, use of a DMD device in a projected light illumination system such as for an automotive headlamp was sometimes considered impossible or inappropriate, because the overall brightness that could be achieved reliably using a DMD was less than needed or desired. Recognition in the present application that the use of multiple illumination sources along with a lowered duty cycle for the micro mirrors in the DMD device overcomes the hinge memory and stiction problems of the prior known approaches, while still achieving increased brightness and without degrading the performance characteristics of the system, advantageously allows the use of the DMD devices and thus provides capabilities for the use of DMD illumination systems in a variety of applications.

BRIEF DESCRIPTION OF THE DRAWINGS

For a more complete understanding of the illustrative embodiments described herein and the advantages thereof, reference is now made to the following descriptions taken in conjunction with the accompanying drawings, in which:

FIG. 1 illustrates in a block diagram a conventional DMD illumination system;

FIG. 3 illustrates in a table an efficiency determination;

FIG. 4 illustrates in a table a set of comparisons for brightness obtained in a DMD system;

FIG. 8A illustrates in a block diagram an embodiment DMD illumination system implemented using a VSP DMD device;

FIG. 8B illustrates in a combined pupil diagram the operation of the system of FIG. 8A;

FIG. 9A illustrates in a block diagram a DMD illumination system implemented using a TRP DMD device;

FIG. 9B illustrates in a combined pupil diagram the operation of the system of FIG. 9A;

FIG. 12 illustrates a table comparing the performance of DMD illumination systems of the prior known approaches and example embodiments;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The making and using of example illustrative embodiments are discussed in detail below. It should be appreciated, however, that the embodiments contemplated as part this application provide many applicable inventive concepts that can be embodied in a wide variety of specific contexts. The specific embodiments discussed are merely illustrative of specific ways to make and use the various embodiments, and the examples described are not to be read so as to limit either the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled."

In the embodiments, novel arrangements are provided for a DMD lighting apparatus with excellent brightness at the output and that is robust, reliable and simple to implement. In the various embodiments, a multiple source illumination system is used. Two or even more illumination sources can be used in various embodiments.

Figure 5:
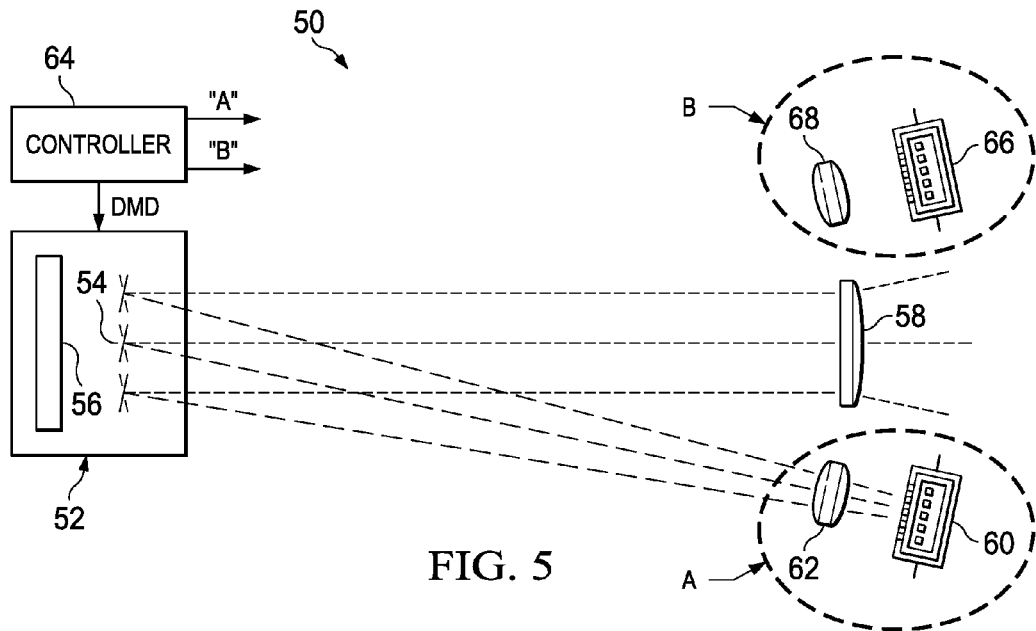
FIG. 5 illustrates in a simplified block diagram an embodiment DMD illumination system.

FIG. 5 depicts in a simple block diagram a system 50 having, for example, dual illumination sources 60, 66 with a DMD device 52 for projecting illumination. In system 50, a DMD device 52 has a substrate 56 and hinged micro-mirrors 54. There may be thousands or millions of micro-mirrors in a rectangular or square micro-mirror array, further the micro-mirrors are individually addressable, and each micro-mirror can tilt to a first position and a second position, responsive to control signals. Each micro-mirror also has a third untilted, or flat, position. A projection optics element 58 such as a lens is used to collect and output the reflected light from the system 50. In an example embodiment, the lens may be part of an automotive headlamp assembly. In system 50, a first illumination source 60 has a first illumination optics element 62 and forms illumination module A. Illumination module A is positioned to direct light onto DMD 52 and to cause light to reflect from the micro-mirrors 54. A second illumination source 66 has a second illumination optics element 68 forms Illumination module B. Illumination module B is also positioned to cause light to reflect from the micro-mirrors 54. A controller 64 provides control signals to the DMD device, and to the light sources 60, in an illumination module A, and 66 in illumination module B. Controller 64 may be, in one embodiment, a DMD controller component that is specifically provided for use with a DMD device. Texas Instruments, Incorporated offers various DMD controllers, for example, the DLPC300 Controller is provided to control the DLP3000 DMD device (also available from Texas Instruments, Incorporated).

Alternative implementations for the controller 64 include controllers implemented as component parts such as commercially available DSPs, microprocessors, microcontrollers, and alternatives such as integrated or user programmable solutions including FPGAs, ASICs, CPLDs, state machines and the like. The controller can include firmware or software, or can be a pure hardware implementation. The controller 64 provides control signals to both the DMD device 52 in FIG. 5, and the on and off signals to the illumination modules A and B, controlling light sources 66 and 60.

Figure 2:
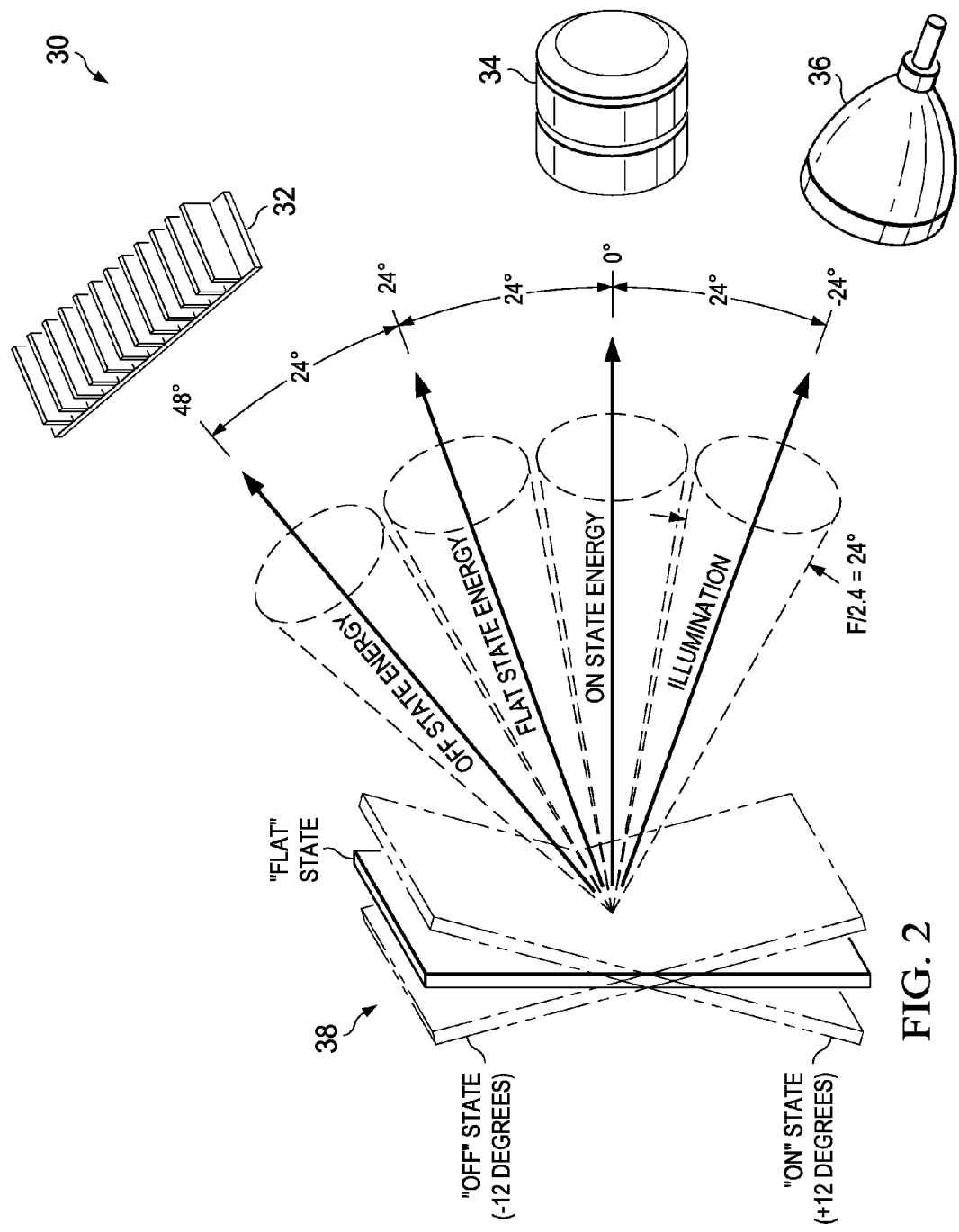
FIG. 2 illustrates in a block diagram the operation of a micro-mirror in a DMD projection system.

In operation, in this example embodiment system 50, the DMD micro-mirrors 54 are arranged to reflect light in two tilted positions. The first tilted position, which corresponds to the "on" state described above, is arranged so that light from the first illumination source 60 strikes the face of the DMD micro-mirrors, and is reflected out to the projection element 58. If the micro-mirrors tilt at +/−12 degrees, then as shown in FIG. 2, the first illumination source 60 and the illumination optics 62 will be positioned at a −24 degree angle from the horizontal. The positions of the illumination source 60 and the illumination optics 62 are chosen so that the angle of reflection will direct the projected light at a zero degree angle into the projection element 58, as the angle of reflection and the angle of incidence will be equal when the micro-mirrors are in the first tilted position, at +12 degrees.

The second illumination source 66 and the corresponding illumination optics 68 in FIG. 5 are positioned at a symmetrical angle on the opposite side of the DMD 52. When the micro-mirrors 54 are in the second tilted position, corresponding to the "off" state described above, the second illumination source 66 and the illumination optics 68 are positioned at an angle of +24 degrees from the horizontal, assuming the DMD device has a second tilt position of −12 degrees. In this second tilted position the light from the second illumination source 66 will be reflected from the micro-mirrors 54 to the projection element 58 and the light will be projected out of the system 50.

In the example illustrative and non-limiting embodiment of FIG. 5, in operation, the illumination sources 60 and 66 can controlled by controller 64 to be pulsed on and off in a synchronous operation with the tilting operations of the DMD 52. Thus the DMD 52 may be operated at a less than 100% duty cycle such as a 50% duty cycle, for example, and the micro-mirrors 54 may be switched from the first tilted position to the second tilted position. Simultaneously, and in synchronicity with the micro-mirror positions, the light sources 60 and 66 may be pulsed on and off. In this manner, the light from each of the light sources 60 and 66 is directed onto the faces of the micro-mirrors 54 and is reflected out of the projection optics 58. No light dumps are needed and no light is projected elsewhere in the system, as the light from the light sources 60 and 66 is only transmitted when the micro-mirrors are in the corresponding tilted position to reflect the light out of the system 50.

In another alternative embodiment, the light sources 60 and 66 may be left on continuously and not pulsed, and the DMD switched from the first tilted position to the second tilted position at a lowered duty cycle, for example at a 50% duty cycle. In this alternative embodiment, the light not reflected out of the projection optics 58 can be collected in a light dump as shown in FIG. 2, instead of being projected. This alternative embodiment uses an approach that is simpler in terms of control signals needed, however, because some light is not projected out of the system, it is also less efficient than the pulsed operation embodiment.

Advantages attained by use of this novel method of using multiple illumination sources include that the DMD can be operated in a continuous 50% duty cycle. Using a duty cycle less than 100% eliminates or substantially reduces the problem of hinge memory or stiction failures that occurred in prior known approaches. Further, the use of the lowered duty cycle relieves the system of thermal budget constraints, as the temperature of the DMD device can now rise substantially higher than in the 100% duty cycle operation and the DMD device will still operate reliably. This is particularly significant in outdoor applications and in automotive, marine, aviation and applications where control of the ambient temperature of the system 50 is impractical or impossible.

In alternative embodiments, duty cycles that are less than 100% but other than 50% could also be used. In these embodiments, the duty cycle could be asymmetric. The dual light sources can be controlled by controller 64 to be pulsed in synchronicity with these alternative duty cycles, so that all of the light produced by the light sources is projected out of the system. These additional variations are also contemplated as additional alternative embodiments and are within the scope of the appended claims.

The light sources 60, 66 can be any bright source but particular types of light sources are especially useful such as quantum dots, lasers, LEDs, and lasers that include down converting materials such as phosphor (so called "phaser" or "laser-phosphor") light sources. In some embodiments the light sources are pulsed, and quantum dot, laser, LEDs and laser-phosphor light sources each provide bright light sources that are compatible with the pulsed operations.

Further, in alternative embodiments, the color spectrum of the illumination sources may be white, such as white LEDs; however in additional alternative embodiments, the visible spectrum may be different for different illumination sources such as red, green, blue, and white and can be common between the illumination sources, or may be different for different ones of the illumination sources.

In order to further increase brightness, LEDs can be used as the illumination sources and the LEDs can be pulse driven in an overdriven state. The frequency of the pulses can be matched to the switching of the DMD micro-mirrors. Because in some embodiments LEDs are used, and the LEDs are pulsed on and off in some of the embodiments, the LEDs can further be pulse driven at supply currents over normal continuous operation current levels, and the brightness output by the LEDs can therefore be increased. Further, etendue squeezing techniques, known to those skilled in the art, can also be used to further enhance the brightness obtained from the LEDs.

In an alternative and additional embodiment to that of FIG. 5, a third illumination source may be added to the system 50. Although in a conventional DMD projection system such as shown in FIG. 1, the micro-mirrors are not used in the "flat" position, in the novel embodiments presented here, the flat position can also be used as a third untilted position for the micro-mirrors in the DMD device, and a third illumination source may be positioned to cause light to reflect out of the projection optics when the micro-mirrors are in the flat position. The third illumination source in the third position may also be a quantum dot, LED, laser, phaser or other bright light source, and the illumination source in the third position may also be pulsed in synchronicity with the micro-mirror positions. In this manner the system may operate with increased efficiency.

Figure 6A:
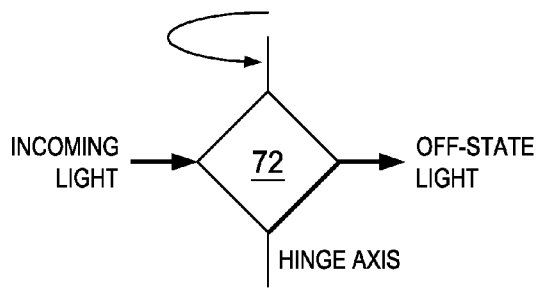
FIG. 6A illustrates the operation of a VSP micro-mirror for use with the embodiments.

In various embodiments, different technology DMD devices may be used. FIG. 6A depicts in a simple drawing a single micro-mirror that pivots on a single hinge axis. Devices such as the "VSP" (very small pixel) technology DMD devices from Texas Instruments, Incorporated operate in this fashion. The VSP micro-mirrors are arranged in a diamond pattern. The illumination light enters the array from the side, the reflected light projects out of the page in FIG. 6A. In the "on" state the micro-mirrors are at a first tilted position to reflect the light out of the page, and in the "off" state, the micro-mirrors are in the second tilted position, tilted in the other direction. In an example DMD, the first and second tilt positions may be +/−12 degrees from a flat position. The flat position is the position the micro-mirrors take when no power is applied to the electrodes in the devices.

Figure 6B:
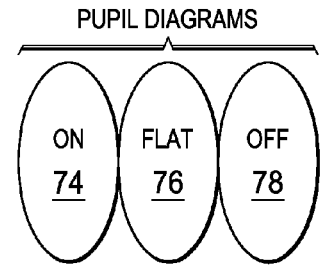
FIG. 6B illustrates in a pupil diagram the operation of the VSP micro-mirror of FIG. 6A.

FIG. 6B depicts a "pupil diagram" for the micro-mirror 72 in FIG. 6A. Reflected light is shown as an oval projecting from the micro-mirror in each of three micro-mirror positions, on, flat, and off (the resulting light ovals are respectively numbered 74, 76, 78 in FIG. 6B). The reflected light is shown projected out of the page and moving along a horizontal axis as the micro-mirror is tilted left, corresponding to the "on" state, flat, and tilted right for position corresponding to the "off" state, the micro-mirror rotating about the vertical hinge axis as shown in FIG. 6A.

Currently VSP DMD devices are available, for example, as 0.3 inch diagonal arrays with WVGA resolution. An example commercially available part is the DLP3000, sold by Texas Instruments, Incorporated, which has an array of 608×684 micrometer sized micro-mirrors, which is 415872 total mirrors. The DLP3000 device is known to be used in digital light projectors (DLP) for television and presentation video projectors, among other applications.

Figure 7A:
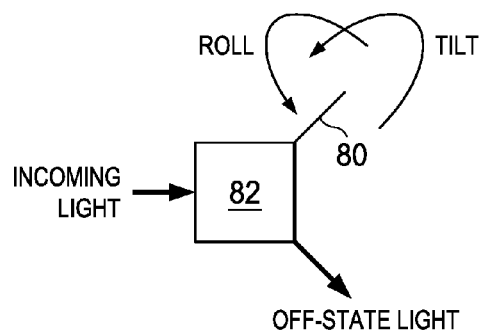
FIG. 7A illustrates the operation of a TRP micro-mirror for use with the embodiments.

In another embodiment, micro-mirrors that move in a different manner can be used. FIG. 7A illustrates a single tilt and roll pixel (TRP) configuration micro-mirror 82. These devices are available, for example, as part number DLP3114 from Texas Instruments, Incorporated. In the TRP technology, the micro-mirrors are formed on a compound hinge 80. The micro-mirrors tilt left horizontally in a first tilted position, and tilt downwards in a second tilted position. The TRP DMD micro-mirrors are oriented in an orthogonal array, and the hinge axis is diagonal and has compound motion, instead of vertical as in the VSP technology devices. FIG. 7A illustrates the movements of a single micro-mirror using TRP DMD technology. The array in the example TRP DMD device DLP3114 has 1280×720 micro-mirrors, or over 921600 pixel elements. This device provides 720p resolution. Other TRP devices offered by Texas Instruments, Incorporated will have over 1 million mirrors. A 0.47 inch array of TRP pixels offers 1080p resolution.

Figure 7B:
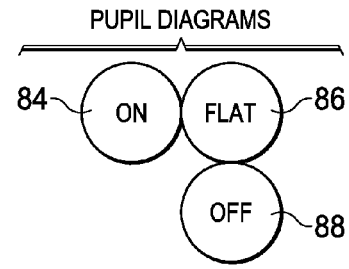
FIG. 7B illustrates in a pupil diagram the operation of the TRP micro-mirror of FIG. 7A.

FIG. 7B illustrates the pupil diagram for the TRP micro-mirror 82 in FIG. 7A. The micro-mirrors in the example Texas Instruments, Incorporated TRP device DLP3114 have +/−17 degrees of tilt. The device is illuminated from one side in a conventional projection system, and the light comes out of the page in FIG. 7A. As shown in FIG. 7B, in the "off" state the micro-mirrors are oriented in a downward direction, so the TRP micro-mirror tilts horizontally in the "on" state and downwards in the opposing state. This compound micro-mirror motion affects the positioning of the illumination sources in the novel embodiments presented herein. As in the embodiment described above using the VSP DMD device, the first illumination source will be to one side of the DMD device, corresponding to the first tilted position in the micro-mirrors, but for the TRP DMD device the second illumination source will be positioned below the DMD device, so that the light from the second illumination source is reflected into a projection optical element when the micro-mirrors are in the second tilted position. In the pupil diagram, the "on" state is shown as oval 84, the flat state is shown as oval 86, and the "off" state is shown as oval 88, indicating where the light will be projected from the TRP device 82.

FIG. 8A illustrates in a simplified block diagram an embodiment system 90 formed using a VSP technology DMD device 92 with multiple illumination sources. In FIG. 8A, DMD 92 is positioned to project light out of the page. A first illumination module, numbered 94, the "A" illumination module, is positioned to one side of the DMD and at an angle that corresponds to a first tilted position of the micro-mirrors in DMD 92. The A illumination module 94 has a light source 96 and illumination optics 98. As described above, light source 96 may be a quantum dot, laser, LED array, laser phosphor, or other light source as described above. The light source may be white or may have different visible color spectrum such as red, green, blue, yellow and the like. The light source 96 can be compatible with a pulsed operation as described above, in certain embodiments control signal pulses are used to control the light source, turning it on and off. A controller 103 provides the control signals to the DMD 92 and to the light sources 96 and 104.

A second illumination module 100, the "B" illumination module, is positioned on an opposite side of the DMD device 92, and includes an illumination source 104 and illumination optics 102. The second illumination module 100 is positioned to cause light to reflect out of the page of FIG. 8A when the micro-mirrors in the DMD 92 are in the second tilted position. In some embodiments, the light sources 96 and 104 may both be white, for example, white LEDs may be used. Additional alternative embodiments can be formed using different color spectrum for the light sources 105 and 96, such as red, green, blue, yellow for one light source and white for the other light source, for example.

In operation, in one example embodiment, the system 90 projects light in a direction out of the page from the light sources 96, 104 while operating the DMD 92 in a 50/50 duty cycle. The illumination module A (94 in FIG. 8A) is positioned at the correct angle to cause the light to reflect out of a projection element (not shown) and out of the page when the VSP micro-mirrors are in the first tilted position. The illumination module B is positioned on the opposite side of the DMD 92 to cause the light to reflect out of the page when the VSP micro-mirrors are in the second tilted position. In an example where the micro-mirrors have +/−12 degrees of tilt, with the zero degree point projecting out of the page, the illumination module A will be positioned the left and at minus 24 degrees, and the illumination module B will be positioned to the right and at plus 24 degrees.

As the micro-mirrors in DMD 92 are switched in the 50/50 duty cycle from the first tilted position to a second tilted position, the illumination modules A and B can be pulsed on, and off, in synchronicity with the DMD switching, so that light is continuously projected by the system (in a direction out of the page in FIG. 8A). As described above, in additional alternative embodiments, the light sources 96 and 104 may not be pulsed. Also as described above, the duty cycle can be some other asymmetrical duty cycle that is less than 100%, such as 70/30 or 30/70, for example. By switching the mirror positions at regular intervals, the hinge memory and stiction problems of the prior known solutions can be substantially reduced or eliminated.

FIG. 8B illustrates the operation of the micro-mirrors in system 90 shown in a combined pupil diagram. Note that the two mirror positions that are referred to as "on" and "off" are now symmetric with respect to the two illumination modules A and B. That is, the "on" state with respect to illumination source A is the "off" state with respect to illumination source B, and vice versa. Thus the two light sources have two different pupil diagrams; however in FIG. 8B these are combined to illustrate the overall operation. In FIG. 8B, the circle 110 labeled "Aon, Bon" corresponds to the zero degree position and is the direction aligned with the projection optics to project light out of the page. The circle 118 labeled "AIll, BFlat" indicates the position of the illumination module A. For a +/−12 degree VSP device, this will be at −24 degrees as in FIG. 2. The circle 112 labeled "AFlat, BIll" illustrates where light from illumination module A will reflect when the micro-mirrors are in the "flat" position. This circle is also the correct position for the "B illumination" light source. For a +/−12 degree VSP DMD device, this would correspond to +24 degrees. The circle 114 labeled "Aoff" illustrates where the light from illumination module A will go if the micro-mirrors are in the second tilted position, the "off" state with respect to illumination source A. The circle 116, labeled "Boff", similarly indicates where the light from the B illumination source will be projected when the micro-mirrors are in an "off" state with respect to illumination module B.

In operation, in an embodiment where the micro-mirrors are operated in the 50/50 duty cycle and the A and B illumination modules are pulsed in synchronicity with the micro-mirrors, the light form the illumination modules A and B is directed to the circle 110, the "Aon Bon" position, and projected out of the page. Other duty cycles can be used, and the light sources for illumination modules A and B can be pulsed in synchronicity with the duty cycle chosen, to form alternative embodiments. In another embodiment, a continuous light source can be used for illumination modules A or B. In such an embodiment, light dumps can be added to the system to collect reflected light that is not projected out of the system.

FIGS. 9A and 9B illustrate a system 120 in a block diagram that illustrates the use of a TRP DMD device 122 in a multiple illumination source embodiment. Controller 138 sends control signals to the DMD device 122, and to the light sources in the illumination modules 124 and 130. Controller 138 can be a controller specifically produced by Texas Instruments, Incorporated for controlling a DMD device. In alternative embodiments, controller 138 can be a DSP, microprocessor, state machine, look-up table, microcontroller, FPGA, ASIC, circuit board or computer, and is generally a programmable or configurable device that can output control signals, and may be implemented as hardware, software and combinations thereof. The DMD device 122 is positioned so that the reflected light will project in a direction that is out of the page in FIG. 9A. Illumination module A, numbered 124, includes a light source 126 and illumination optics 128 such as a beam shaper that directs light onto the faces of the micro-mirrors of the DMD 122 when the micro-mirrors are in the first tilted position Similarly, illumination module B, numbered 130, includes light source 134 and illumination optics 132 which are configured to direct light onto the faces of the micro-mirrors of the DMD 112 when the micro-mirrors are positioned in a second tilted position, which is now an "on" state with respect to illumination module B.

The operation of the system 120 is the same as for the system 90 in FIG. 8A except that the illumination modules A and B are positioned to direct light onto the micro-mirrors in the DMD 112 when the TRP micro-mirrors are in a first tilted position and a second tilted position. Because the TRP micro-mirrors have a diagonal hinge axis and move in the tilt and roll directions, instead of moving left and right on a vertical hinge axis as in the VSP devices described above, the illumination sources A and B are now positioned to correspond to the TRP mirror tilted positions.

The combined pupil diagram in FIG. 9B further illustrates the operation of system 120. The circle 142 labeled "AIll" corresponds to the position the illumination module A is placed in to cause light from the illumination module A to be reflected into the circle 140 labeled "Aon Bon". The circle labeled "BIll" 152 corresponds to the position that the illumination module B is in so as to reflect light in to the "Aon Bon" circle 140 when the micro-mirrors are in the second position (the "off" state with respect to illumination module A, which is now the "on" state for illumination module B). The remaining circles 144, 146, 154, 156 in the combined pixel diagram illustrate the position where light is reflected when the micro-mirrors in TRP DMD device 122 are in the "flat" state and the "off" state, with respect to each of the A and B illumination modules.

In operation, the DMD 122 and the illumination modules A and B (126, 134) in FIG. 9A can be operated in synchronicity so that the light sources are pulsed and the micro-mirrors are switched in a 50/50 duty cycle to direct light out of the page in FIG. 9A in a continuous fashion, in the manner described above. Other duty cycles can be used to form alternative arrangements. Continuous light sources can be used to form additional embodiments. In yet another embodiment arrangement, a third illumination source that reflects light into the projection optics when the TRP DMD 122 is in the "flat" position may be added to the dual illumination system 120, to create additional alternative embodiments.

Figure 10A:
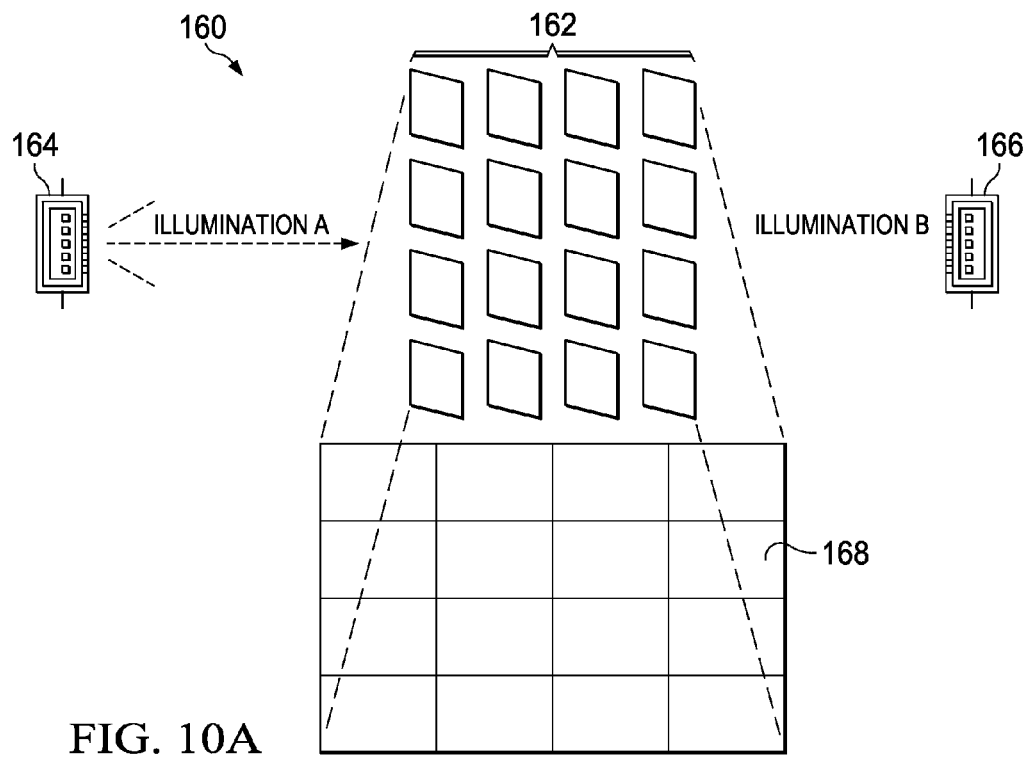
FIG. 10A illustrates in a block diagram the operation of a DMD system of the embodiments using a VSP DMD device.
Figure 10B:
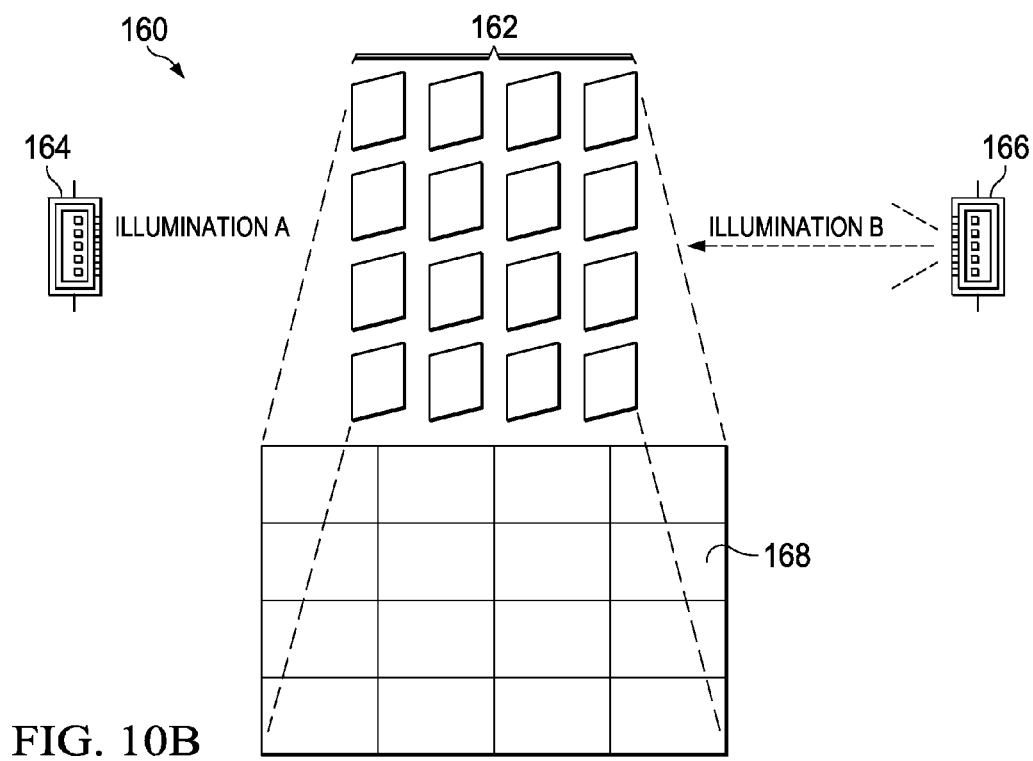
FIG. 10B further illustrates in a block diagram the operation of the DMD system of FIG. 10A.

FIGS. 10A and 10B further illustrate the operation of an embodiment dual illumination system 160 using a DMD device 162 in a horizontal configuration. In FIG. 10A, the DMD device 162 may be a VSP device or other device that has an array of mirrors that tilts on a vertical axis from one side to the other side in a first tilted position and a second tilted position. The dual illumination sources 164, 166 (Illumination A, Illumination B in the figure) are positioned along the horizontal axis running through the DMD device 162 and on opposing sides of the DMD device 162. In FIG. 10A, the first illumination source 162 (projecting Illumination A) is shown as active. The light strikes the micro-mirrors on device 162 while they are in the first tilted position. If the DMD 162 has a +/−12 degree tilt, as in a VSP device from Texas Instruments, Incorporated described above, then the angle of incidence will be at −24 degrees, as shown in FIG. 2 for example. In this manner the reflected light 168 will leave the digital micro-mirrors from DMD 162 at the zero degree position.

Similarly, FIG. 10B depicts the system 160 when the micro-mirrors in device 162 are at a second tilted position to receive the light from Illumination B. When the DMD device 162 is a +/−12 degree tilt device, the second illumination source 166 is placed at the +24 degrees position, and the reflected light 168 will leave the DMD device 162 at the zero degree position. In this manner the light is all reflected to the projection optics and out of the system.

In an embodiment, the dual illumination sources in system 160 are pulsed in synchronicity with the micro-mirror position alternating between the first tilted position and the second tilted position. In an alternative embodiment, the dual illumination sources 164, 166 can be used and remain active. In this embodiment, some light is dumped into light dumps; however, the dual illumination sources and the switched duty cycle operation of the micro-mirrors still ensure that the light projected from the system is brighter than that achieved with prior known solutions, and that light is continuously output from system 160 for maximum brightness.

Figure 11A:
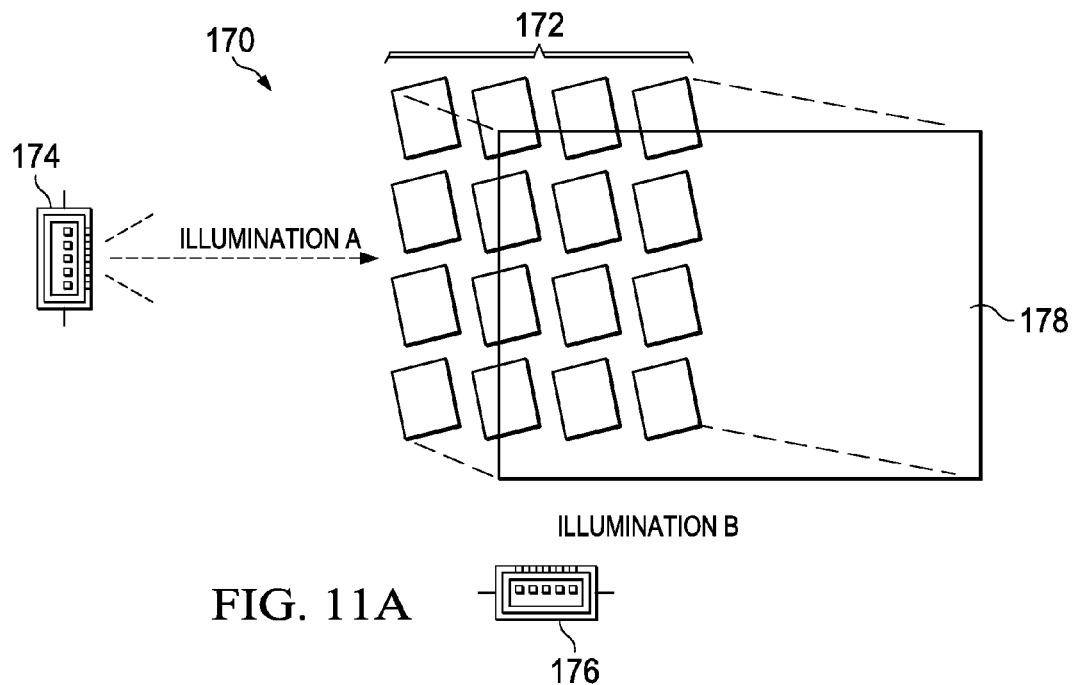
FIG. 11A illustrates in a block diagram the operation of a DMD of system of the embodiments using a TRP DMD device.
Figure 11B:
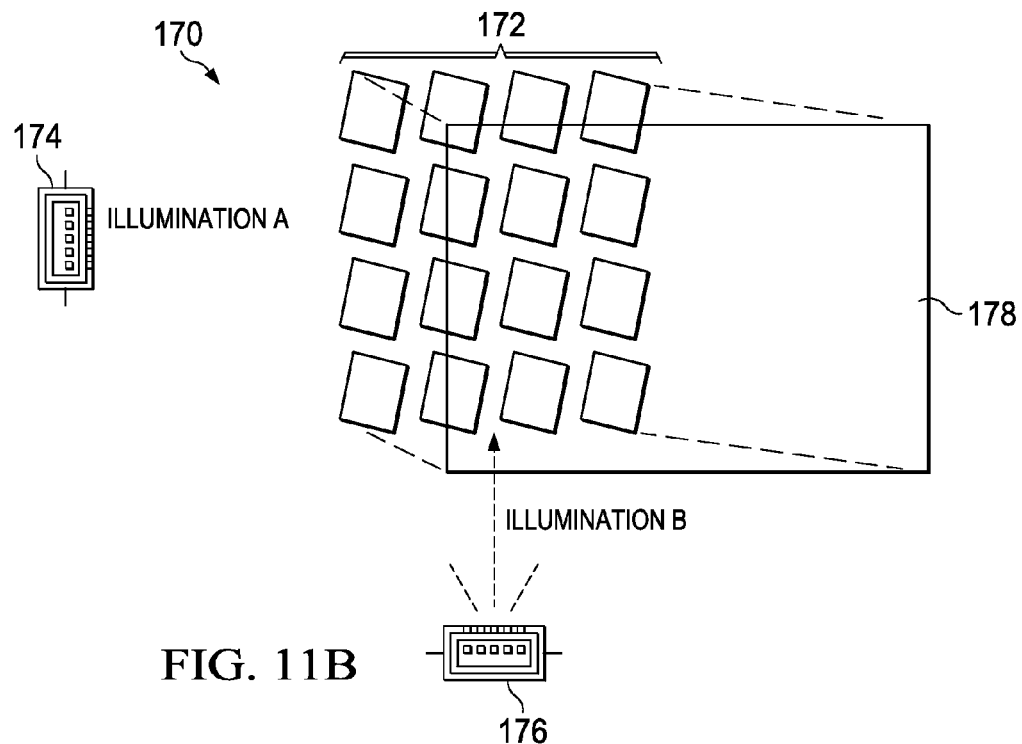
FIG. 11B further illustrates in a block diagram the operation of the DMD system of FIG. 11A.

FIGS. 11A and 11B depict in further detail an embodiment multiple illumination source system 170 using a DMD device 172 with micro-mirrors that perform the compound tilt and roll (TRP) motion about a diagonal axis. In these embodiments, the first illumination source 174, (projecting Illumination A), is to one side on the horizontal axis running through the DMD 172 and positioned to project light onto the micro-mirrors in device 172 when the micro-mirrors are in a first tilted position. This situation is illustrated in FIG. 11A. The reflected light 178 is then projected out of the system 170.

In FIG. 11B, the micro-mirrors in device 172 are in a second tilted position, which is now the "on" state with respect to projected Illumination B, and the second illumination source 176 is therefore positioned below the DMD device, to project light onto the faces of the micro-mirrors when they are tilted downwards in the second tilted position. The reflected light 178 is then projected at the zero degree position and out of the projection optics of the system 170.

The examples of the VSP DMD and TRP DMD devices described above illustrate embodiments formed with DMD devices that are currently commercially available on the market from Texas Instruments, Incorporated. However, the embodiments and the appended claims of this application are not so limited. Various DMD devices can be used in the embodiments. In an embodiment, three illumination sources may be used and positioned to cause reflected light to be projected when the micro-mirrors are in a first tilted position, a flat position, and a second tilted position. In some embodiments, dual illumination sources are positioned so that when the micro-mirrors are in a first tilted position, a first illumination source provides light onto the micro-mirrors that is reflected into a projection optics and output from the system. When the micro-mirrors are then placed into a second tilted position, a second illumination source provides light that is reflected from the micro-mirrors into projection optics and out of the system. In the embodiments, the advantages accrue by use of multiple illumination sources, and, by switching the DMD micro-mirrors at a duty cycle so that hinge memory and stiction problems of the prior known solutions do not occur. The duty cycle may be a symmetrical 50% duty cycle, however, the embodiments are not so limited and other switching duty cycles may be used. The light sources may be pulsed on and off, however in alternative embodiments that are also contemplated and which fall within the scope of the appended claims, the light sources may be applied in a continuous manner. Light that strikes the micro-mirrors in a state where the reflection is not to the projection optics but in another direction may be collected in a light dump device, to absorb any excess heat that is present. The light sources used in the illumination modules and the DMD devices may be controlled by a dedicated controller device, or by programmable processors or microprocessors, DSPs, microcontrollers, state machines, ASICs, FPGAs, CPLDs and the like.

FIG. 12 illustrates in table 181 the brightness obtained in simulations for systems configured using the dual illumination source embodiments. Evaluations were performed for DMD devices including a 0.3 WVGA DMD device from Texas Instruments, Incorporated formed using the VSP micro-mirrors that tilt horizontally about a vertical axis, and a 0.47 inch diagonal TRP DMD device from Texas Instruments, Incorporated formed using the TRP micro-mirrors described above which tilt in a compound fashion about a diagonal axis, first horizontally in a first tilted position, and then vertically in a second tilted position.

In the first row of the table, labeled "0.3 WVGA", an angle of incidence (AOI) of 36 degrees was used with a first LED device number Q6WP from OSRAM Opto Semiconductors that has an output at the LED of 800 lumens. Three configurations were compared; first the prior known single illumination system such as shown in FIG. 1 was operated in a prior known approach at 100% duty cycle. (For this operation to be reliable, and not have hinge memory or stiction faults, the temperature at the DMD device must be below a relatively low operating temperature, as indicated in the column heading in the table.) A brightness of only 345 lumens was obtained. This evaluation result is shown in the column labeled "Single illumination, Low Temp., 100% DC."

In the column labeled "Single illumination, Higher Temp., DC 50/50", the evaluation was performed with the same DMD device and LED source, operated in a prior known approach at a 50% duty cycle, which alleviates the problems with hinge memory and stiction for temperatures. However, when the single illumination system of FIG. 1, for example, is operated in this manner, the resulting brightness is further reduced (since light is only reflected 50% of the time) and a brightness of only 260 lumens was obtained, as shown in the first row, labeled 0.3 WVGA, in table 181.

In the column labeled "Dual illumination, Higher Temp, .DC-50/50", a third evaluation was performed for the same LED device and DMD device, however in this example the dual illumination sources of the novel embodiments were used such as shown in FIG. 5. In this evaluation, the brightness obtained was 520 lumens, about twice that of the prior known approach using a 50/50 duty cycle as shown in the middle column of results in table 181. The use of the embodiments thus advantageously provides output brightness greater than any of the prior known approaches, and provides robust and reliable DMD operation up to a higher operating temperatures, such as for example at temperatures up to 90° C. and even higher.

In the remaining rows of the table 181 in FIG. 12, additional evaluation results are shown for different LED light sources numbered LE UW U1A3, LE UW U1A5, also from Osram Opto Semiconductor Company. In each example, the brightness obtained using the embodiments, shown in the results column labeled "Dual illumination Higher Temp. DC-50/50" are substantially greater than that of the prior known approaches. The use of the embodiments further provides reliable operation at higher temperatures than those that can be maintained using the single illumination source approach at a 100% duty cycle.

For example, in the last row of the table 181 of FIG. 12, an Osram Opto Semiconductors LED numbered LE UW U1A5 was evaluated that has a 1590 lumens output at the LED, using a 0.47 inch DMD from Texas Instruments, Incorporated device having TRP micro-mirrors. Using the dual illumination embodiments such as shown in FIGS. 11A and 11B, the brightness obtained in the evaluation was 1035 lumens.

Figure 13A:
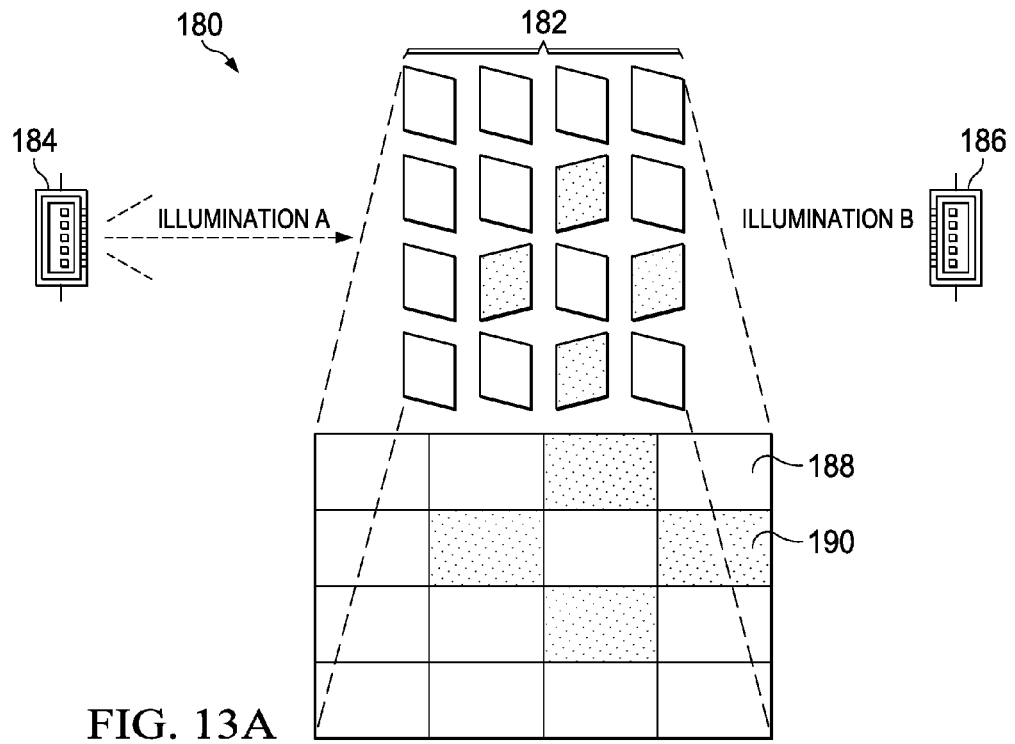
FIG. 13A illustrates in a block diagram the operation of a DMD illumination system of the embodiments using adaptive beam shaping.
Figure 13B:
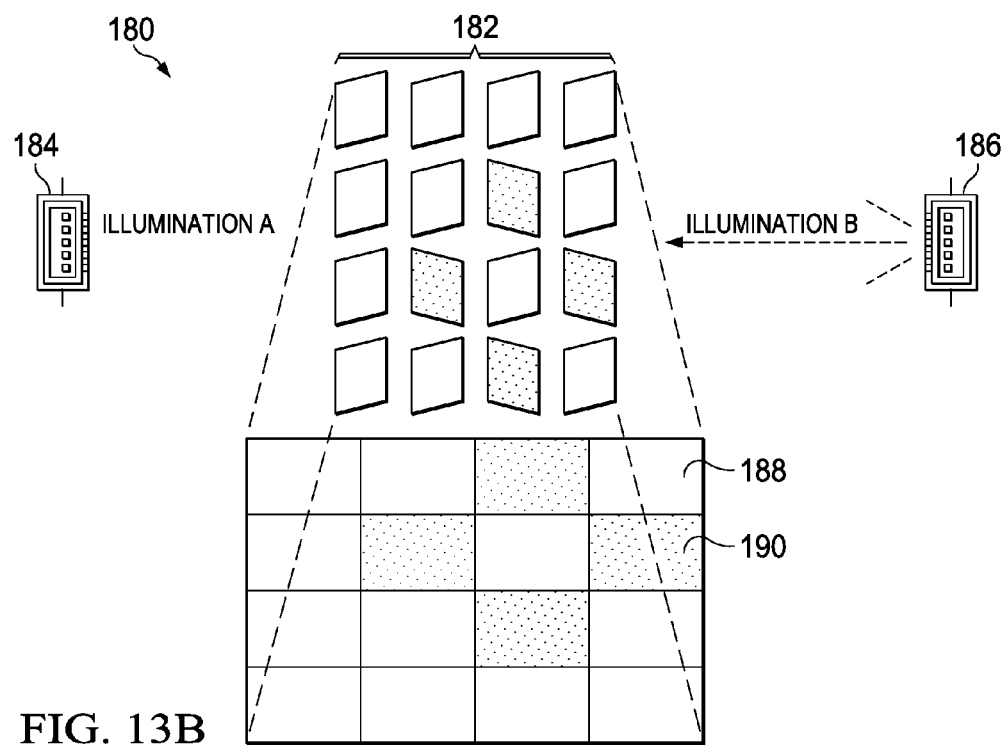
FIG. 13B further illustrates in a block diagram the operation of the DMD illumination system of FIG. 13A.

FIGS. 13A and 13B further illustrate another aspect of the embodiments. In FIG. 13A, an adaptive beam arrangement is illustrated. As described above, the micro-mirrors of the DMD devices used with the embodiments are individually addressable. The pattern of the light beam projected by the system can be altered by the controller according to the needs of a particular application by tilting some of the micro-mirrors in device in an inverted manner from the remainder, so that some of the micro-mirrors are in the first tilted position when the remainder are in the second tilted position, changing the projected beam pattern that is output by the system. In this instance the DMD can be used as a spatial light modulator.

FIG. 13A illustrates in detail a non-limiting example. An illumination system 180 includes a DMD device 182 (in this non-limiting example, the DMD device is a horizontal tilt device such as the VSP example device described above). A pattern 190 is obtained in the projected light beam 188 by modifying the tilt pattern for four (in this example) micro-mirrors in the DMD device 182. The light source 184 is active in FIG. 15, and the four mirrors that form pattern 190 are tilted away from the illumination A, while the remaining mirrors in DMD device 182 are tilted to reflect the light from light source 184.

FIG. 13B illustrates in detail the same non-limiting example as in FIG. 13A. The system 180 is shown now with the light source 186 that active, and Illumination B is projecting light onto the micro-mirrors of device 182, the pattern 190 again appears in the light beam 188. The pattern obtained with the 50% duty cycle is the same for both the light source 184, Illumination A, and light source 186, Illumination B.

In an example application, an automotive headlamp is implemented using the novel embodiments described above, and the projected beam can be adaptively modified. For example, in the automotive headlamp application, when oncoming traffic is detected as the car travels along a roadway; the adaptive light beam can be dipped lower and directed away from the eyes of the drivers in the oncoming traffic, while the overall brightness is maintained. Once the oncoming traffic passes the light beam can be returned to a normal pattern. These functions can be performed autonomously, freeing the car driver from the responsibility of manually switching from high-beam to low-beam positions, for example.

In additional embodiments, the profiles of the illumination sources can be varied, that is, the two illumination sources need not be identical; and additional beam shaping and adaptive beam shaping can be accomplished by using different illumination profiles for the multiple illumination sources. Different color spectrum can be used for the two illumination sources to further control the beam projected from the headlamp.

Use of the embodiments advantageously provides a DMD illumination system with enhanced brightness, adaptive beam capability, robust and reliable operation, high temperature operation, and extended DMD lifetime without the hinge memory and stiction failure concerns that exist in the prior known solutions.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A DMD illumination system, comprising:
   a light projection system;
   a plurality of illumination sources arranged proximate to a digital micro-mirror device and configured for directing light from the illumination sources onto an array of micro-mirrors in the digital micro-mirror device having a plurality of positions, each of the plurality of positions corresponding to a position of a respective one of the illumination sources, the light from the illumination sources being reflected from the array of micro-mirrors towards the light projection system; and
   control circuity coupled to the illumination sources and to the digital micro-mirror device configured for controlling the array of micro-mirrors to put at least some of the micro-mirrors in a particular one of the plurality of positions by applying one or more control signals to the digital micro-mirror device, and further configured for providing control signals to control the illumination sources, so that for the particular one of the positions, light from a respective one of the illumination sources is directed to the array of micro-mirrors and reflected from the array of micro-mirrors into the light projection system;
   wherein the light projection system is configured for collecting the reflected light and projecting the collected light out of the light projection system.

2. The DMD illumination system of claim 1, wherein at least one of the illumination sources comprises one selected from the group consisting essentially of LEDs, lasers, lasers with down converting material including a phosphor, and quantum dots.

3. The DMD illumination system of claim 1, wherein at least one of the illumination sources comprises one selected from the group consisting essentially of white, red, blue and green visible light spectrum illumination sources.

4. The DMD illumination system of claim 1, wherein the illumination sources comprise first and second illumination sources, and the micro-mirrors are configured to move between a first tilted position on a horizontal axis and a second tilted position on the horizontal axis.

5. The DMD illumination system of claim 4, wherein the first illumination source is positioned along the horizontal axis and on one side of the digital micro-mirror device corresponding to the first tilted position, and the second illumination source is positioned along the horizontal axis and on an opposing side of the digital micro-mirror device corresponding to the second tilted position.

6. The DMD illumination system of claim 1, wherein the illumination sources comprise first and second illumination sources, and the micro-mirrors are configured to move between a first tilted position on a horizontal axis and a second tilted position that is below the horizontal axis and lies along a vertical axis.

7. The DMD illumination system of claim 6, wherein the first illumination source is positioned along the horizontal axis and on one side of the digital micro-mirror device corresponding to the first tilted position, and the second illumination source is positioned along the vertical axis and below the digital micro-mirror device corresponding to the second tilted position.

8. The DMD illumination system of claim 1, wherein the illumination sources comprise first, second and third illumination sources, and the micro-mirrors are configured to move between a first tilted position, a flat position and a second tilted position, whererin the first, second and third illumination sources are positioned to direct light onto the micro-mirrors when at least some of the micro-mirrors are in the first tilted position, the flat position and the second tilted position, respectively.

9. The DMD illumination system of claim 1, wherein the micro-mirrors are individually addressable, and the controller is configured to form an adaptive beam pattern by controlling at least some of the micro-mirrors to be in a tilted position that differs from a tilted position of remaining ones of the micro-mirrors, while light from at least one of the illumination sources is being reflected from the array of micro-mirrors towards the light projection system.

10. The DMD illumination system of claim 1, wherein the DMD illumination system comprises a lamp that is one selected from the group consisting essentially of an automotive headlamp, a spotlight, an aircraft headlamp, a stage light, an outdoor area light, a motorcycle headlamp, a marine headlamp, a flashlight, a traffic light, and a security light.

11. A method for projecting light for illumination from a DMD device, comprising:
   directing light from a plurality of illumination sources proximate to a digital micro-mirror device onto an array of micro-mirrors in the digital micro-mirror device having a plurality of positions, each of the plurality of positions corresponding to a position of a respective one of the illumination sources, the light from the illumination sources being reflected from the array of micro-mirrors towards a light projection system;
   collecting the reflected light into the light projection system, and projecting the collected light out of the light projection system; and
   controlling the array of micro-mirrors to put at least some of the micro-mirrors in a particular one of the plurality of positions, and controlling the illumination sources, so that for the particular one of the positions, light from a respective one of the illumination sources is directed to the array of micro-mirrors and reflected into the light projection system.

12. The method of claim 11, wherein at least one of the illumination sources comprises one selected from the group consisting essentially of white, red, blue and green visible light spectrum illumination sources.

13. The method of claim 11, wherein at least one of the illumination sources comprises one selected from the group consisting essentially of LEDs, lasers, lasers with down converting material including a phosphor, and quantum dots.

14. The method of claim 11 wherein directing light from the plurality of illumination sources comprises: directing light from a first illumination source onto the array of micro-mirrors when at least some of the micro-mirrors are in a first tilted position, and directing light from a second illumination source onto the array of micro-mirrors when at least some of the micro-mirrors are in a second tilted position.

15. The method of claim 11, wherein the digital micro-mirror device comprises one selected from the group consisting essentially of a tilt and roll pixel digital micro-mirror device and a very small pixel digital micro-mirror device.

16. The method of claim 11, wherein controlling the array of micro-mirrors comprises: adaptively controlling the array of micro-mirrors, so that when light is directed from a selected one of the illumination sources onto the array of micro-mirrors and reflected by the array of micro-mirrors, at least some of the micro-mirrors are tilted away from the selected one of the illumination sources, the projected light being adaptively shaped by positions of the micro-mirrors.

17. The method of claim 11, wherein the illumination sources are pulsed, so that light is directed from a selected one of the illumination sources onto the array of micro-mirrors when at least some of the micro-mirrors are in a position corresponding to the position of the selected one of the illumination sources.

18. A dual illumination source DMD headlamp, comprising:
   light projection optics;
   a digital micro-mirror device comprising an array of micro-mirrors configured to move between a plurality of positions including a first tilted position and a second tilted position, responsive to control signals;
   a first illumination source arranged proximate to the digital micro-mirror device and positioned to direct light from the first illumination source onto the array of micro-mirrors in the digital micro-mirror device, the light from the first illumination source being reflected towards the light projection optics from the array of micro-mirrors when at least some of the micro-mirrors are in the first tilted position, so the first tilted position corresponds to a position of the first illumination source;
   a second illumination source arranged proximate to the digital micro-mirror device and positioned to direct light from the second illumination source onto the array of micro-mirrors in the digital micro-mirror device, the light from the second illumination source being reflected towards the light projection optics from the array of micro-mirrors when at least some of the micro-mirrors are in the second tilted position, so the second tilted position corresponds to a position of the second illumination source; and
   a controller configured to send control signals to control the array of the micro-mirrors to put at least some of the micro-mirrors in a particular one of the plurality of positions while simultaneously pulsing at least one of the first illumination source and the second illumination source, so that for the particular one of the positions, light directed from a respective one of the first illumination source and the second illumination source is directed to the array of micro-mirrors and reflected from the array of micro-mirrors into the light projection optics;

wherein the light projection optics are configured to collect the reflected light and, through a lens, project the collected light out of the light projection optics.

19. The headlamp of claim 18, wherein the controller is configured to send the control signals to cause at least some of the micro-mirrors to switch between the first tilted position and the second tilted position at a 50% duty cycle.

20. The headlamp of claim 18, wherein at least one of the first illumination source and the second illumination source comprises one selected from the group consisting essentially of lasers, LEDs, quantum dots and lasers with down converting material including a phosphor.

* * * * *